(12) United States Patent
Miles

(10) Patent No.: US 6,451,093 B1
(45) Date of Patent: Sep. 17, 2002

(54) CENTRIPETAL DEMISTER

(76) Inventor: Charles C. Miles, 1371 Austin Ave., Idaho Falls, ID (US) 83404

( * ) Notice: Subject to any disclaimer, the term of this patent is extended or adjusted under 35 U.S.C. 154(b) by 17 days.

(21) Appl. No.: 09/766,986

(22) Filed: Jan. 22, 2001

(51) Int. Cl.⁷ .................. B01D 45/14; B01D 47/06
(52) U.S. Cl. .............. 95/270; 55/409; 55/477; 96/189; 96/286; 96/359; 261/117
(58) Field of Search .......... 55/400, 406, 408, 55/409, 477, 418; 96/188, 189, 190, 286, 359; 261/117; 95/270

(56) References Cited

U.S. PATENT DOCUMENTS 3,561,195 A * 2/1971 Bouru ................. 415/180
4,981,502 A * 1/1991 Gottschalk ............... 55/400

* cited by examiner

Primary Examiner—Robert A. Hopkins
(74) Attorney, Agent, or Firm—Alan D. Kirsch

(57) ABSTRACT

A centripetal demister system and method for the removal of moisture from a moisture laden gas stream using both centrifugal and centripetal force to shear the moisture from a inlet gas, the centripetal force also directing the inlet gas radially inward for collecting the demisted gas. The present invention is particular useful for removal of environmentally harmful particulates contained within the moisture laden gas stream, the particulates and moisture being force against the interior of the housing by centrifugal force while the demisted gas is drawn radially inward by centripetal force.

18 Claims, 2 Drawing Sheets

CENTRIPETAL DEMISTER

BACKGROUND OF THE INVENTION

This invention relates to a method and apparatus for demisting a gaseous stream and more particularly to the separation of moisture and solid materials from gaseous streams through the use of a centripetal demister.

The conventional technique for demisting gaseous streams has typically involved the use of filtration. However, moisture collecting on the filter media drastically reduces the life of th filters. Replacement of the these filters, such as High Efficiency Particulate Air (HEPA), is time consuming, expensive and inherently impacts operating schedules and budget. Consequently, means for reducing the degradation of the filter media have been sought such as the use of pre-filters installed upstream of HEPA filters. This has been found to be of limited benefit, typically extending the life of the filter media by only a few days. Also, pre-filters and filter media tend to become clogged from solid materials that may be contained within the gaseous stream.

It is an object of the present invention to provide a demister apparatus for separating moisture and solid materials from a moisture laden gaseous stream by using centripetal force.

It is another object of the present invention to provide an economical centripetal demister apparatus for separating harmful moisture and solid materials from a gaseous stream in order to recover or vent the demisted gas.

It is still a further object of the present invention to provide a demister method and apparatus capable of removing or demisting and removing small size droplets from a gaseous stream.

It is still a further object of the present invention to provide a demister method and apparatus that uses much less liquid than a conventional water scrubber and further that the liquid used in the present invention can be recovered and used again.

It is still a further object of the present invention to provide a demister method and apparatus for removing moisture and environmentally harmful solid material prior to a secondary filtration such as a HEPA filter.

It is still another object of the present invention to provide demister system that is self cleaning and will not plug readily with any solutions, mists, or mists and solids.

Additional objects, advantages and novel features of the invention will become apparent to those skilled in the art upon examination of the following and by practice of the invention.

SUMMARY OF THE INVENTION

To achieve the foregoing and other objects, a method and apparatus for demisting a gaseous stream is provided. The demister apparatus comprises a housing having at least one gas inlet through which moisture laden gas at a first pressure enters. The housing also contains at least a portion of a rotatable hollow shaft having vanes, stiff bristles or wire brushes, extending radially outward therefrom. The hollow shaft has multiple holes throughout the portion of the shaft that is contained within the housing.

The rotation of the shaft, and vanes attached thereto, creates a centrifugal force that separates the moisture, and any particles contained within the gaseous stream, from the gas. The moisture (fluid) and particles are then collected from the housing through a drain, such as a gravity, or pumped drain.

Upon separation of the moisture and/or particles from the gaseous stream, the demisted gas is then drawn radially inward by centripetal force through the holes in the shaft wall. The centripetal force is provided by maintaining the pressure within the hollow shaft at a lower level than the pressure of the gas at the inlet to the housing. The demisted gas can then be collected or, since the harmful particulates have been removed, simply exhausted into the ambient atmosphere.

In another preferred embodiment of the present invention, a moisturizing system is provided to the gas stream prior to its introduction into the housing. By providing sufficient moisture, particulates within the gas become entrained in the moisture, thereby facilitating the removal of the particulates from the gaseous stream. The water or other fluid can be introduced either in the gas inlet of injected into the hollow shaft core where it is flung radially outward and hence collected as waste.

BRIEF DESCRIPTION OF THE DRAWINGS

The present invention is illustrated in the accompanying drawings where.

DETAILED DESCRIPTION OF THE INVENTION

Figure 1:
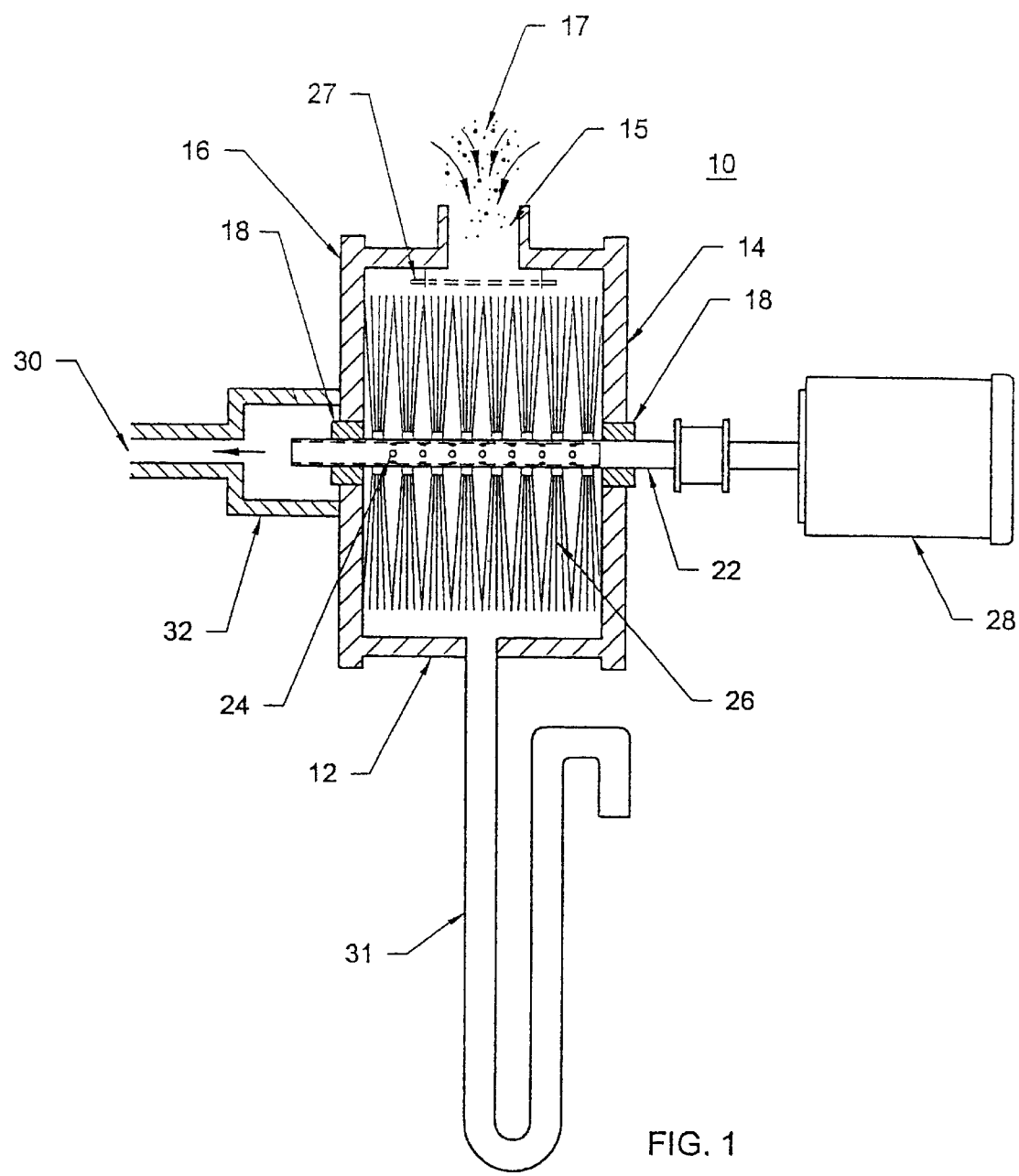
FIG. 1 is a schematic perspective view, partly in section, of an apparatus according to the invention including a drainage system and optional gas collection system.

In the following description, similar components are referred to by the same reference numeral in order to simplify the understanding of the sequential aspect of the drawings.

Referring now to FIG. 1 a schematic view of a centripetal demister 10 according to the invention is shown. The demister 10 comprises a housing 12 having a first end 14 and a second end 16. The housing 12 has at least one gas inlet 15 through which moisture laden gas 17 is introduced into the housing 12. Apertures are provided in the first and second ends 14 and 16 respectively, through which a rotatable hollow shaft 22 is positioned. As shown in the section view of FIG. 1, the portion of the hollow shaft 22 that is contained within the housing 12 has a plurality of holes 24 through which gas may enter the interior portion of the hollow shaft 22.

Also, as can be seen in FIG. 1, vanes 26 are attached to the hollow shaft 22 and extend radially outward therefrom. In a preferred embodiment of the invention, the vanes 26 can be stiff resilient bristles, brushes, wire brushes, thin tubes, or rods. A system for rotating the hollow shaft 22 is shown in FIG. 1 as a motor 28 connected to the shaft. Sealed bearings 18 can also be provided to promote a longer operating life for the rotating shaft 22. Generally, it is desired to provide a rotation speed from between 100 rpm to 10,000 rpm, depending upon the moisture content of the inlet gas, desired dryness of the demisted gas, and the size of the entrained particles. An optional baffle 27 may be provided near the housing gas inlet 15 to break the gas inlet stream so a jet of gas will not impinge directly on the vanes 26.

Figure 2:
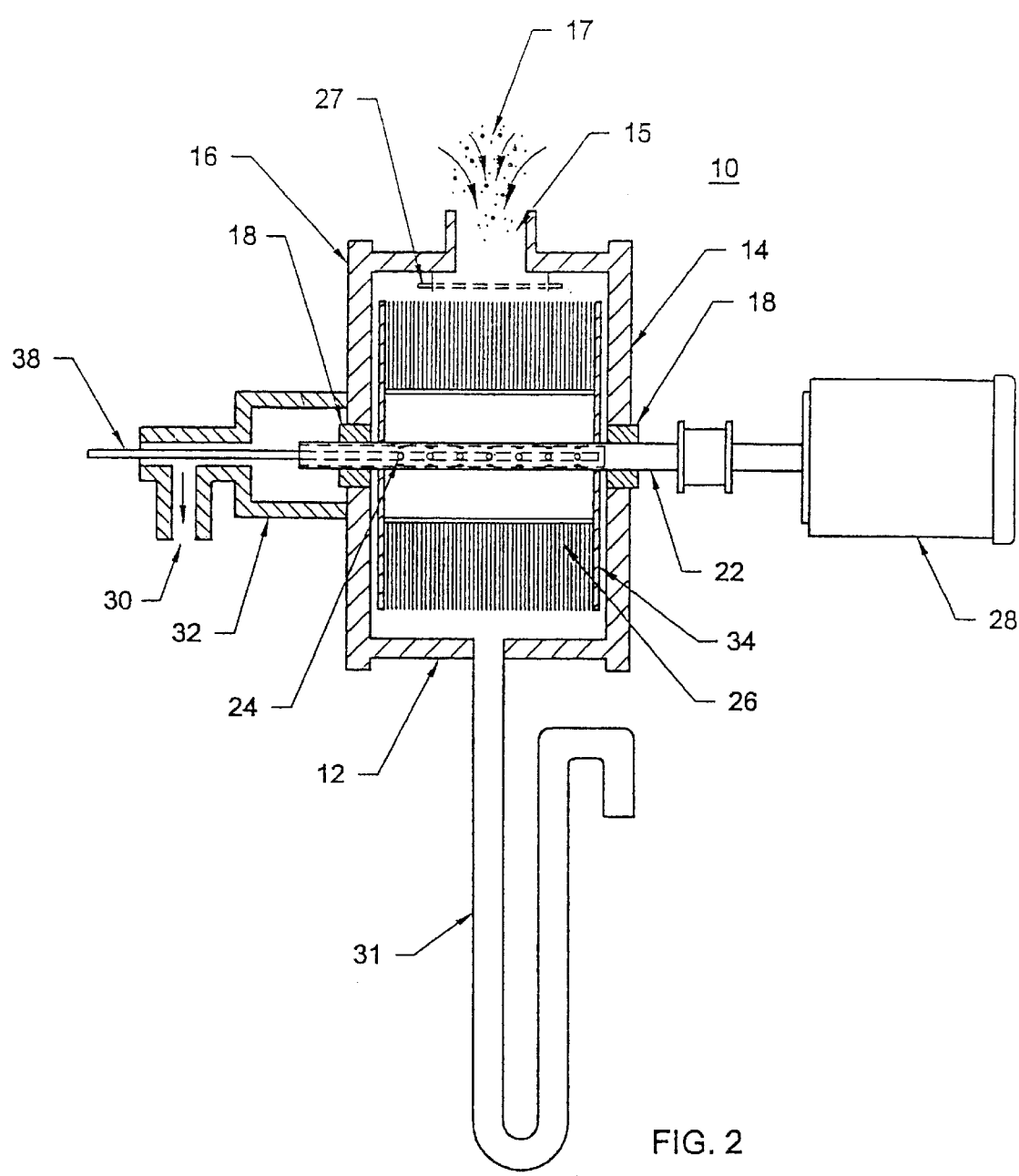
FIG. 2 is a perspective view, in section, of an alternate construction of the rotating hollow shaft and vanes.

In operation of the present invention a moisture laden gas stream 17 enters the housing though housing inlet 15. Additionally, the moisture laden gas stream can further include solid matter, such as particulates. A moisturizing system can be provided to establish or maintain a desired moisture content of the gas entering the housing inlet 15. For example, the moisturizing means could be the injection of a mist into the incoming gaseous stream prior to, or proximately to, the gas entering the housing. Alternatively, as shown in FIG. 2, the moisturizing system could include injecting moisture from a water injection tube 38 contained within the core of the hollow shaft 22, thereby providing a moisture flow counter to the gas entering the housing.

The pressure of the gas entering the housing is greater than the pressure maintained within the interior of the hollow shaft 22. An optional pressurization system can be employed upstream of the housing gas inlet 15 to maintain a desired inlet gas pressure. Multiple inlets can be provided in the present invention, thereby increasing the throughput of the gas to be process by the centripetal demister. Upon entering the housing the moisture laden gas, in the form of a fine or coarse mist, contacts the rotating vanes. The mist droplets, and solid particles contained therein, if any, are forced to the interior walls of the housing 12 by a centrifugal force that is created from the rotation of the shaft 22 and vanes 26. Due to the relatively low mass of the gas molecules, the centrifugal force from the rotating vanes has little effect on the gas, so that the droplets and particulates are sheared from the gaseous stream.

By maintaining the pressure within the hollow shaft at a level lower than the pressure of the inlet gas, a centripetal force is created. Due to this centripetal force the gas enters the housing and is directed radially inward through the holes 24 in the shaft 22. The demisted gas 30 is then vented from the shaft 20. Also exhaust gas collection means 32 may be provided to the present invention to recover the demisted gas and enhance the removal of the demisted gas from the housing. The exhaust gas collection means can be sealed for handling exhaust gases still containing small amounts of harmful particulates or for handling radioactively contaminated gases.

Another feature of the centripetal demister include the use of a drain to remove collected fluid and particles from the housing. The drain can be a gravity drain 31 through the bottom of the housing. Alternatively, the drain can be a pump system, such as a sump pump or external pump, to remove volumes of collected fluid and solid materials. The sump or drain furthermore can be U-shaped to act as a water trap preventing purified gas from escaping the housing.

The present invention is not limited in size, shape or configuration. The demister of the present invention can be configured in a vertical or horizontal position, or any other position in between, thereby enhancing the number of applications that the centripetal demister can be used. The diameter of the brush wires may be fine or coarse, and the speed may be any value up to failure of the brush. Experimental studies have shown that a lower rotation speed may actually be preferred in some circumstances, depending upon the configuration of the brush wires. For example, at very high speed (e.g., 5500 rpm) the wire bristles tend to separate into bands, thereby permitting unobstructed flow of the inlet gas to the hollow shaft core. This is easily solved by providing spacers periodically along the length of the hollow shaft or by packing the brushes more compactly on the shaft.

Also a preferred method for securing the wire brushes (i.e., vanes 26) to the hollow shaft 22 consists of sliding the brush axially into a dove tail groove machined into the hollow shaft 22. The fluid passage holes 24 are provided in the hollow shaft 22 along lines parallel to and between the dove tail grooves. This method for attaching the wire brush to the hollow shaft 22 eliminates any clear path of the inlet gas to the hollow shaft without contact with the wire brush and hence allows a high speed of rotation.

Referring now to FIG. 2, an alternate embodiment of the invention is shown. As shown in FIG. 2, the vanes 26 can be offset from the hollow shaft 22 by rigid supports (discs) 34 spaced along the length of the hollow shaft, the rigid supports 34 thereby connecting the vanes 26 to the hollow shaft 22. An advantage to this embodiment is that it allows almost any rotation speed to be attained without the brush wires separating into bands.

The operating pressure can be any value from very low (e.g., atmospheric) to very high (e.g., hundreds of atmospheres) limited only by the strength of the housing and piping system. As long as the inlet pressure is higher that the pressure maintained within the core of the hollow shaft, the system will function.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical application and enable others skilled in the art to utilize the invention in various embodiments and with various modifications as are suited to the particular use contemplated. It is intended that the scope of the invention be defined by the claims appended hereto.

What is claimed:

1. A demister for separating entrained droplets from a gas stream, comprising:

a housing having first and second ends, said first and second ends having apertures, said housing further having at least one gas inlet through which moisture laden gas at a first pressure enters said housing;

a rotatable hollow shaft having first and second ends, at least one of said shaft ends being open, said shaft being positioned through said housing apertures, a portion of said shaft being contained within said housing, said shaft having holes along the portion contained within said housing and having a pressure within said hollow shaft that is less than the first pressure at said gas inlet;

bristles extending radially outward from said shaft portion contained within said housing;

a rotation system drivably rotating said hollow shaft and bristles, thereby creating a centrifugal force to direct entrained droplets from said moisture laden gas stream toward the housing while said gas flows under centripetal force from said inlet radially inward to said hollow shaft;

a waste collection system connected to said housing for collecting accumulated droplets from within said housing.

2. The demister of claim 1 wherein said bristles are wire brushes.

3. The demister of claim 1 wherein said moisture laden gas contains particulates, said particulates and entrained droplets being directed toward the housing by said centrifugal force created, said particulates and droplets then being collected and exhausted from said housing by said waste collection system.

4. The demister of claim 1 further comprising a moisturizing system to provide moisture to a gas prior to the moisture laden gas entering said housing through said gas inlet.

5. The demister of claim 1 further comprising a moisturizing system to inject moisture into a core of said hollow shaft, said injected moisture flowing counter to said gas entering said housing.

6. The demister of claim 1 further comprising a gas exhaust system fluidicially connected to said hollow shaft to withdraw said gas from within said hollow shaft.

7. A demister for separating entrained droplets from a gas stream, comprising:
- a housing having at least one gas inlet through which moisture laden gas at a first pressure enters said housing;
- a rotatable hollow shaft having holes and a pressure within said hollow shaft that is less than the first pressure at said gas inlet;
- bristles extending radially outward from said shaft portion contained within said housing;
- a rotation system drivably rotating said hollow shaft and bristles, thereby creating a centrifugal force to direct entrained droplets from said moisture laden gas stream toward the housing while said gas flows under centripetal force from said inlet radially inward to said hollow shaft;
- a waste collection system connected to said housing for collecting accumulated droplets from within said housing.

8. The demister of claim 7 wherein said bristles are wire brushes.

9. The demister of claim 7 wherein said moisture laden gas contains particulates, said particulates and entrained droplets being directed toward the housing by said centrifugal force created, said particulates and droplets then being collected and exhausted from said housing by said waste collection system.

10. The demister of claim 7 further comprising a moisturizing system to provide moisture to a gas prior to the moisture laden gas entering said housing through said gas inlet.

11. The demister of claim 7 further comprising a moisturizing system to inject moisture from a core of said hollow shaft, said injected moisture flowing counter to said gas entering said housing.

12. The demister of claim 7 further comprising a gas exhaust system fluidicially connected to said hollow shaft to withdraw said gas from within said hollow shaft wherein said drain is a gravity fed drain.

13. The demister of claim 7 wherein said bristles are mounted in grooves parallel to a longitudinal axis of said shaft.

14. The demister of claim 7 wherein said bristles are offset from said shaft by rigid supports.

15. The demister of claim 7 further comprising a baffle within said housing and proximate to said gas inlet, said baffle to prevent the direct impingement of the said moisture laden gas onto said bristles.

16. A method for separating entrained droplets from a gaseous stream, comprising:
- directing a moisture laden gas stream at a first pressure into a housing;
- providing a rotating hollow shaft, said hollow shaft having bristles attached thereto and extending radially outward from said shaft, said shaft having a pressure within that is less than said first pressure of said moisture laden gas stream;
- creating a centrifugal force from said rotating shaft and bristles, said centrifugal force thereby separating moisture droplets from said moisture laden gas which are directed toward said housing;
- creating a centripetal force by said inlet pressure being greater than said pressure within said hollow shaft, said gas thereby flowing radially inward toward said hollow shaft axis;
- providing a gas outlet from said hollow shaft through which gas flows out from said housing;
- collecting and removing accumulated droplets from within said housing.

17. The method of claim 16 further comprising moisturizing a gas to provide a desired moisture content of said moisture laden gas.

18. The method of claim 15 wherein said desired moisture content is sufficient to remove, by said centrifugal force, particulates contained within said moisture laden gas.

* * * * *

UNITED STATES PATENT AND TRADEMARK OFFICE
CERTIFICATE OF CORRECTION

PATENT NO.    : 6,451,093 B1
DATED         : September 17, 2002
INVENTOR(S)   : Charles C. Miles It is certified that error appears in the above-identified patent and that said Letters Patent is hereby corrected as shown below:

Column 1,
Line 11, delete "th" and insert therefor -- the --;
Line 44, before "demister" insert -- a --;

Column 3,
Line 15, delete "process" and insert therefor -- processed --;
Line 45, delete "purified" and insert therefor -- unpurified --;

Column 4,
Line 14, delete "that" and insert therefor -- than --.

Signed and Sealed this

Eleventh Day of February, 2003

JAMES E. ROGAN
*Director of the United States Patent and Trademark Office*